Patented Jan. 27, 1942

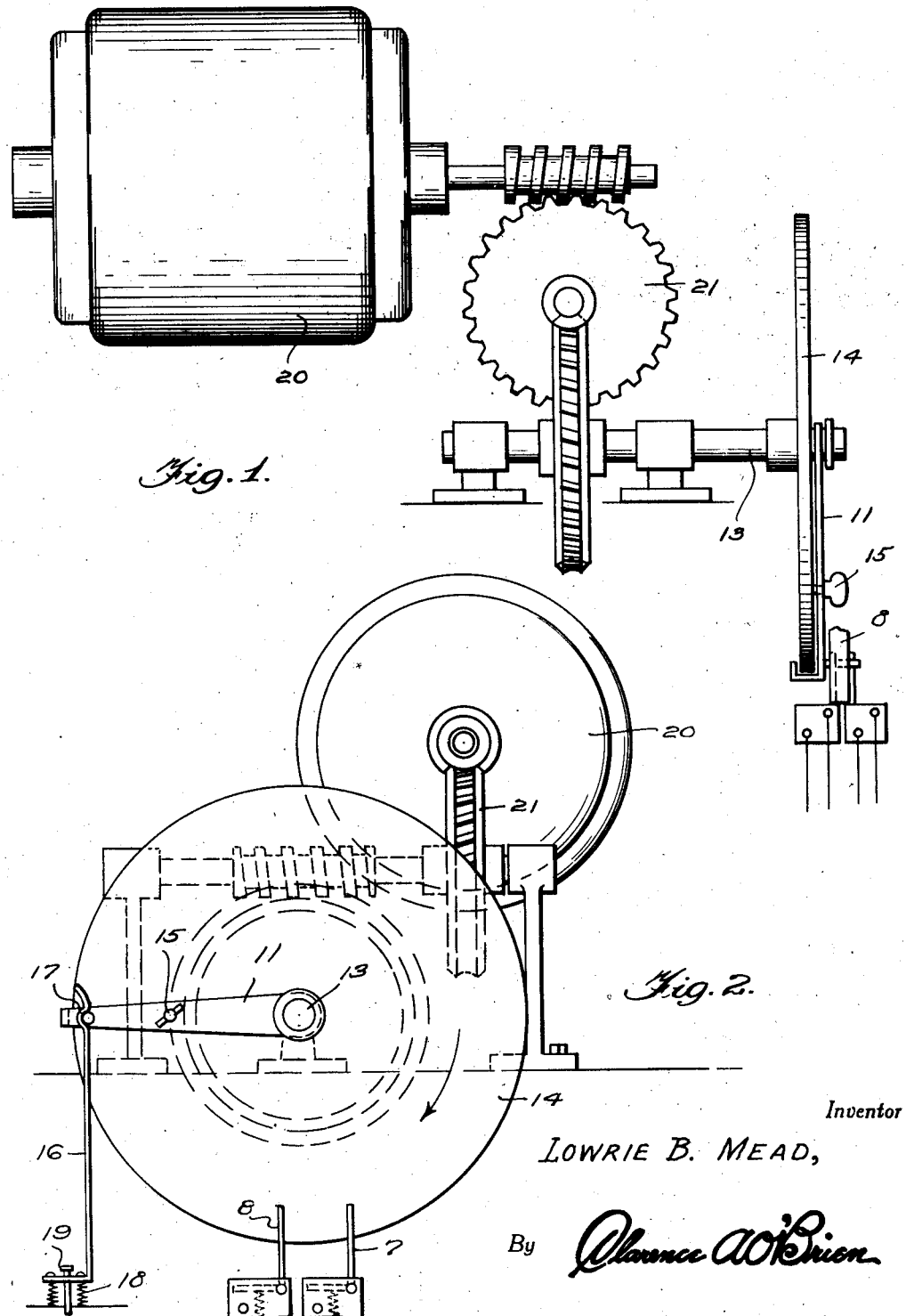

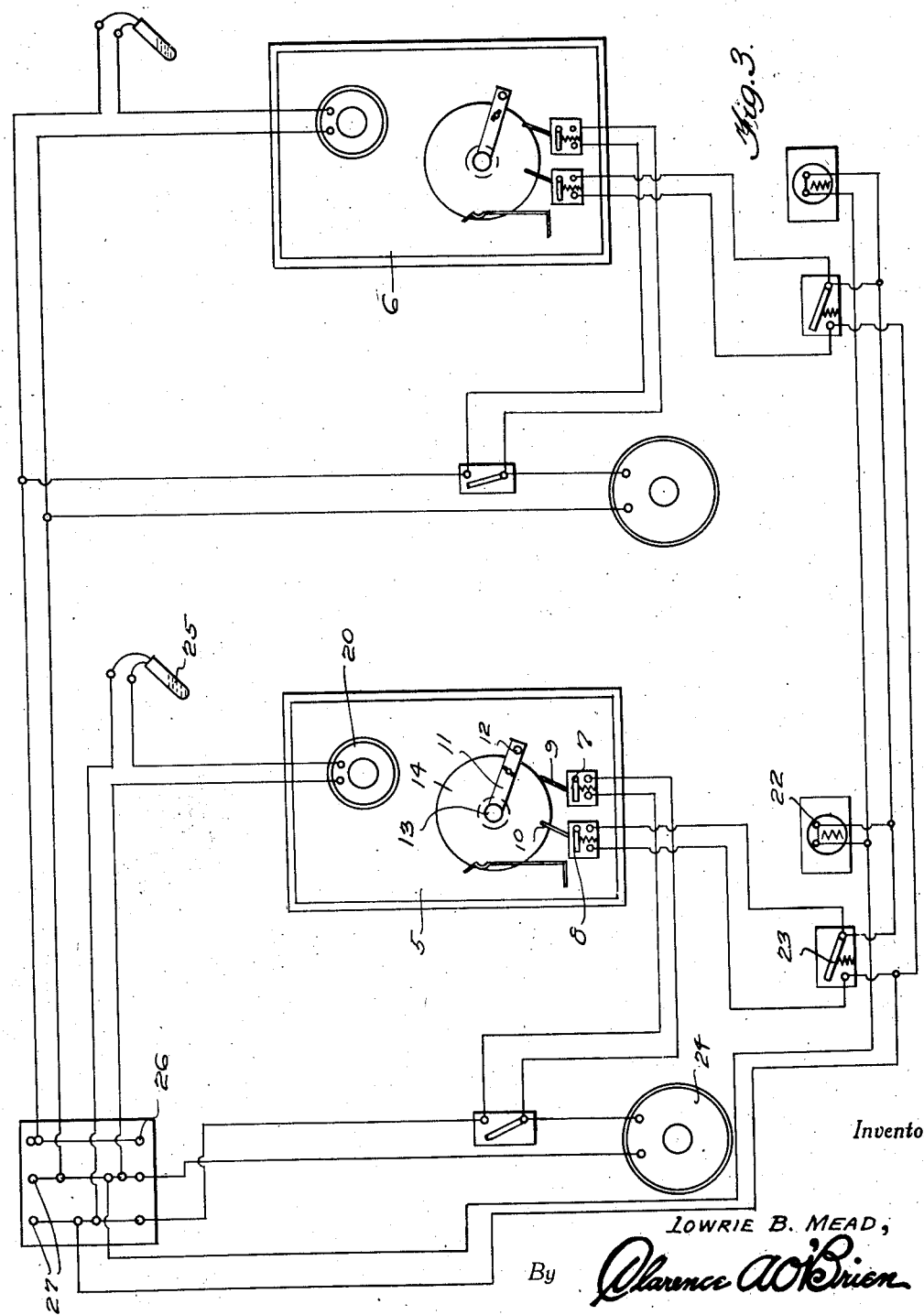

2,270,886

UNITED STATES PATENT OFFICE 2,270,886

AUTOMATIC STARTING AND CHANGE-OVER OPERATING MECHANISM FOR MOTION PICTURE PROJECTION MACHINES

Lowrie B. Mead, Chicago, Ill.

Application June 11, 1940, Serial No. 339,997

5 Claims. (Cl. 88—17)

The present invention relates to new and useful improvements in devices for automatically starting and changing over from an outgoing to an incoming motion picture projection machine, and has for its primary object to provide switch control means for the circuit of the outgoing as well as for the incoming machine and providing a motor-driven trip device operatively connected in the circuit with the usual reel end alarm device for the machine to simultaneously trip the switches to change over the operation of one projection machine to the other.

In motion picture theaters where continuous and uninterrupted performance is vital, there is installed a minimum of two projectors, two change-over switches and two electrically operated change-overs. When approximately one minute running time of film is left on the outgoing projector, a weighted roller riding on the film in the magazine drops with its lever arm and causes an alarm to sound. This is a signal to light the incoming projector arc and then to watch the screen for the appearance of the black dots in the upper right-hand corner of the projected picture. At the appearance of the first set of dots, the manually operated switch in the incoming projector driving motor circuit is closed by hand, which starts this motor and brings the incoming projector up to normal speed. After eleven feet of film have passed through both the incoming and outgoing projectors, a second set of dots appear on the screen and at this instant the foot switch is closed at the incoming projector which momentarily energizes both change-overs. The change-over of the incoming projector opens its shutter simultaneously with the closing of the change-over shutter on the outgoing projector, thereby changing the projected picture from one projector to another.

It is the object of the present invention to perform the above mentioned functions automatically and to provide a mechanism for this purpose of simple and practical construction, which is efficient and reliable in performance, relatively inexpensive to manufacture and install in operative position and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which—

Figure 1 is a side elevational view of the rotating trip mechanism for simultaneously throwing the switches of the outgoing and incoming projectors, Figure 2 is a front elevational view thereof, and Figure 3 is a diagram of the electric circuit connecting two of the projectors and with the change-over trip mechanism shown in association with each thereof.

Referring now to the drawings in detail, wherein for the purpose of illustration I have disclosed a preferred embodiment of the invention, and with particular reference to the diagram shown in Figure 3 of the drawings, the numeral 5 designates the automatic change-over control mechanism for one projection machine, and the numeral 6 designates a similar control mechanism for the second projection machine. Each control mechanism is of identical construction, and accordingly, a detailed explanation of one will suffice for both. The starting motor switch for the incoming projector is shown at 7 and the change-over switch is designated at 8, these switches being of identical construction and arranged in close proximity to each other, in the manner as illustrated.

Each of these switches include switch arms 9 and 10, respectively, arranged in the path of a trip arm 11 having a pin 12 on its outer end adapted for contacting the respective switch arms 9 and 10. The trip arm 11 is mounted on a shaft 13, together with a disk 14, the arm being secured in position for rotation with the disk by means of a set screw 15, the arm being free of the shaft 11 for adjustment circumferentially on the disk.

The disk is adapted for clockwise rotation as indicated by the arrow in Figure 2 of the drawings, and the trip arm is adjusted on the disk in a set position by means of a spring catch 16 having its free end provided with an offset as shown at 17 for releasably engaging the pin 12, the other end of the catch being attached to a stationary part of the machine by means of a pair of expansible coil springs 18 secured to a supporting structure, the springs being adapted to urge the catch 16 vertically with respect to the axis of the shaft 13, the catch being secured in adjusted position by means of a set screw 19.

The disk 14 and arm 11 are driven by the shaft 13 through an electric motor 20 by means of reduction gearing designated generally at 21. The conventional change-over mechanism for the projector is designated at 22 in Figure 3 of the drawings which is connected in the circuit with the change-over switch 8, together with a foot control switch 23. The driving motor controlled by the switch 7 is shown at 24 also having a manually operable switch connected thereto.

The mercury switch 25 forming part of the reel end alarm device is included in the circuit with the motor 20 for the trip mechanism and the circuits for all of the aforesaid devices extend to the electric panel 26 having the terminals 27 for connecting to the power line.

In the operation of the device, upon the sounding of the reel end alarm the mercury switch 25 is tilted, thereby closing the circuit with the motor 20. Through the reduction gearing 21 the disk 14 and trip arm 11 are rotated at 0.72 R. P. M., the trip arm being released from the catch 16. The pin 12 will then come into contact with the switch arm 9 starting the motor for the incoming projector. After 7.3 seconds further rotation of the disk tripping arm, the same momentarily closes and opens the switch 8 which operates the electric change-over. The 7.3 seconds referred to corresponds to the travel time of eleven feet of film through the projector at standard film speed of ninety feet per minute and which eleven feet is the distance between the visual start and change-over cue mark placed on the film.

After the change-over has been automatically made and when the film end has passed through the outgoing projector the switch 7 is manually returned to open position which stops the outgoing projector. The mercury switch 25 is controlled by the magazine door of the outgoing projector so that as the door is opened the switch 25 is also opened, which stops the motor 20. The trip arm 11 is then returned to its starting position and secured by the thumb screw 15 and the device is ready for the next cycle of operation.

It is believed the details of construction, manner of operation and advantages of the device will be readily understood from the foregoing without further detailed explanation.

Having thus described the invention, what I claim is:

1. An automatic change-over for a plurality of motion picture projection machines in which each machine is provided with a motor starting switch, a change-over control switch and a reel end alarm switch, and a normally inactive motor driven trip mechanism actuated by the closing of the alarm switch and adapted for actuating both the change-over control switch and the motor starting switch, said trip mechanism comprising a rotating member, and an arm freely mounted on the axis of the rotating member and adjustably connected thereto for engaging the last two named switches during rotation of the member.

2. An automatic change-over for a plurality of motion picture projection machines in which each machine is provided with a motor starting switch, a change-over control switch and a reel end alarm switch, and a normally inactive motor driven trip mechanism actuated by the closing of the alarm switch and adapted for actuating both the change-over control switch and the motor starting switch, said trip mechanism comprising a rotating member, an arm freely mounted on the axis of the rotating member and adjustably connected thereto for engaging the last two named switches during rotation of the member and a catch releasably retaining the arm in a predetermined starting position.

3. An automatic change-over for a plurality of motion picture projection machines in which each machine is provided with a motor starting switch, a change-over control switch and a reel end alarm switch, and a normally inactive motor driven trip mechanism actuated by the closing of the alarm switch and adapted for actuating both the change-over control switch and the motor starting switch, said trip mechanism comprising a rotating member, an arm freely mounted on the axis of the rotating member and adjustably connected thereto for engaging the last two named switches during rotation of the member and a catch releasably retaining the arm in a predetermined starting position and means for adjusting the position of the catch to change the starting position of the arm.

4. An automatic change-over for a plurality of motion picture projection machines in which each machine is provided with a motor starting switch, a change-over control switch and a reel end alarm switch, and a normally inactive motor driven trip mechanism actuated by the closing of the alarm switch and adapted for actuating both the change-over control switch and the motor starting switch said trip mechanism comprising a motor driven shaft, a disk secured thereto and an arm free on the shaft and adjustably secured to the disk for rotation therewith, said arm projecting radially of the disk and having its outer end adapted for engaging said last two named switches.

5. An automatic change-over for a plurality of motion picture projection machines in which each machine is provided with a motor starting switch, a change-over control switch and a reel end alarm switch, and a normally inactive motor driven trip mechanism actuated by the closing of the alarm switch and adapted for actuating both the change-over control switch and the motor starting switch, said trip mechanism comprising a motor driven shaft, a disk secured thereto and an arm free on the shaft and adjustably secured to the disk for rotation therewith, said arm projecting radially of the disk and having its outer end adapted for engaging said last two named switches and a spring catch releasably retaining the arm in a predetermined starting position.

LOWRIE B. MEAD.